United States Patent [19]
Blyler, Jr. et al.

[11] Patent Number: 4,913,508
[45] Date of Patent: Apr. 3, 1990

[54] PASSIVE OPTICAL DEVICE

[75] Inventors: Lee L. Blyler, Jr., Basking Ridge, N.J.; Gary J. Grimes, Thornton, Colo.

[73] Assignee: AT&T Bell Laboratories, Murray Hill, N.J.

[21] Appl. No.: 252,091

[22] Filed: Sep. 30, 1988

[51] Int. Cl.$^4$ .............................................. G02B 6/28
[52] U.S. Cl. ................................................. 350/96.16
[58] Field of Search ........................... 350/96.15, 96.16

[56] References Cited

U.S. PATENT DOCUMENTS

| | | | |
|---|---|---|---|
| 3,874,781 | 4/1975 | Thiel | 350/96.16 |
| 4,198,118 | 4/1980 | Porter | 350/96.16 |
| 4,212,512 | 7/1980 | Hodge | 350/96.15 |
| 4,213,670 | 7/1980 | Milton et al. | 350/96.16 |
| 4,305,641 | 12/1981 | Witte | 350/96.15 |
| 4,449,783 | 5/1984 | Witte | 350/96.16 |
| 4,484,794 | 11/1984 | Witte | 350/96.16 |
| 4,714,313 | 12/1987 | Kapany et al. | 350/96.16 |

OTHER PUBLICATIONS

T. Yoshizawa and T. Kawata in *Plastics in Telecommunication IV* (Rubber and Plastics Institute, 11 Hobart Pl., London UK) 1986, pp. 11/1 to 11/7.

W. B. Beck and M. H. Hodge, *Laser Focus*, Dec. 1984.

R. W. Lay, *Electronic Engineering Times*, Jan. 5, 1987, p. 35.

N. S. Kapany, *Fiber Optics, Principles and Applications*, Academic Press, New York, 1967, pp. 7-9.

F. W. Billmeyer, Jr., *Textbook of Polymer Science*, 2nd ed. Wiley-Interscience, New York, 1971, Chapter 16.

*U. V. Curing: Science and Technology*, S. P. Pappas Editor, Technology Marketing Corp., Norwalk Conn. 1978) (Only the Table of Contents was provided).

*Primary Examiner*—Frank Gonzalez
*Attorney, Agent, or Firm*—Bruce S. Schneider

[57] ABSTRACT

A relatively inexpensive and relatively efficient coupler is obtained by connecting two fiber collections with a polymer material, provided the numerical aperture of the two collections are relatively well-matched to each other and to the polymer region. This efficiency is achieved despite relatively large mismatches in the refractive index of the resin material relative to the fibers. Couplers for optical backplanes are produced in one embodiment utilizing plastic materials. In this technique, a collection of fibers is inserted on each end of an enclosure such as a tube that is filled with a polymer that is subsequently cured.

8 Claims, 2 Drawing Sheets

DIRECTION OF TRANSMISSION

PASSIVE OPTICAL DEVICE

BACKGROUND OF THE INVENTION

1. Field of the Invention

This invention relates to optical waveguide devices and in particular passive optical waveguide devices.

2. Art Background

Passive optical waveguide devices are utilized in a variety of ways. For example, it is often desirable to transfer lightwave information from one optical fiber to another. Significantly more complicated couplers for transfer of optical information are also required. Passive waveguide devices (often denominated optical couplers) are required to allow transfer of information from all fibers in a collection of fibers to all fibers in a second collection. An optical coupler is exemplified in FIG. 1 where information coming from a fiber in collection 5 is transferred to all the fibers of collection 7.

A coupler-based application receiving a great deal of attention involves optical backplanes. For complex electronic systems, such as electronic telecommunication switches and computers, the interconnection of electronic circuit boards is complex, costly and space-consuming. Indeed, capacities are presently being limited by electromagnetic interference associated with dense electrical interconnections at high information transfer rates, e.g. rates typically above 1 Mbit/sec. One method of easing this complication and increasing capacity is the optical transference of information between circuit boards. A structure utilized for this purpose is typically called an optical backplane. An exemplary backplane is shown in FIG. 2 and includes inputs, 9 on circuit boards 17, outputs, 10, and a coupler within structure 14.

Practically, the advantage of increased capacity is concomitantly diminished by increased cost. The couplers in an optical backplane generally significantly affect the cost. Therefore, nominal coupler cost is essential. Various optical couplers have been proposed. However, their production yields are quite low and their cost high. For example, in one fabrication technique, a portion of the cladding on a plurality of glass optical fibers is removed by etching and the bared core portions are twisted together. This twisted mass is fused under tension to produce a monolithic waveguiding structure between two optical fiber collections. Not only is the cost of this structure quite high, but also the optical properties are variable and are not entirely desirable, e.g. a non-uniform distribution of optical modes occurs in the output collection.

Some molding techniques have been employed in an attempt to produce less complex, more easily fabricated optical interconnections. For example as described by T. Yoshizawa and T. Kawata in *Plastics in Telecommunication IV* (Rubber and Plastics Institute, 11 Hobart Pl., London U.K.) 1986, pages 11/1 to 11/7, a transparent silicone mold defining a cylindrical void is produced. Optical fiber collections are inserted in each end of the mold. An ultraviolet (UV) radiation-curable core resin is introduced into the mold and solidified by UV irradiation through the transparent mold. The mold is then removed and a lower refractive index UV-curable cladding resin is placed over the hardened resin and solidified to complete the coupler. The fabrication procedure for this coupler is still relatively complex and has only been demonstrated for large diameter fibers in small collections. Therefore, a low cost passive optical waveguiding device such as an optical coupler having versatility and desirable optical properties is not presently available.

SUMMARY OF THE INVENTION

Low cost optical couplers and therefore relatively low cost optical waveguiding devices are produced by utilizing a specific structure. In particular, a resin-filled cladding polymer region forming an optical mixing waveguide is utilized to optically connect fiber collections. (The term collection encompasses both one and a plurality of fibers). The core areas of the fibers in one collection are not necessarily equivalent to those of the second, but instead are sized to ensure relatively efficient transfer of optical energy. Additionally, the numerical apertures (NA's) of the fibers employed and the NA of the optical mixing waveguide are matched, i.e. a numerical aperture decrease less than 20% in the transmission direction is utilized. Excellent results are achieved despite the probability of obtaining a relatively large mismatch in refractive index between the fiber cores and the waveguide core mixing region because of the matching of NA's. Thus, contrary to conventional wisdom, a refractive index mismatch is knowingly produced, but has been found to produce relatively minor signal reflection losses and allows a critical match of numerical apertures.

In an exemplary embodiment a fluorinated ethylene-propylene copolymer tube is filled with a resin material such as a thermally curable dimethyl siloxane resin, e.g. Shin-Etsu KE 103. A collection of fibers (0.48 NA plastic-clad silica fibers) is inserted into each end of the tube and the resin allowed to cure. The total cross-sectional area of the cores of the fibers in each collection and the cross-sectional area of the optical mixing core region are sized to substantially match. Additionally, the numerical aperture differences are adjusted to less than 20%. By choosing the exemplary compositions previously described the NA difference is 9%. Despite a refractive index difference between the fiber cores and resin material of 0.09, coupling efficiencies greater than 60% are achieved. Significantly such coupling efficiencies are, in fact, achieved where the number of fibers entering each side of the coupler are not equal. Thus the applicants' invention allows significant flexibility in the design of the structures such as optical backplanes.

BRIEF DESCRIPTION

FIG. 1 is a diagrammatic illustration of a coupler;
FIG. 2 is illustrative of optical backplanes; and
FIGS. 3 and 4 are illustrative of embodiments of the invention.

DETAILED DESCRIPTION

Figure 1:
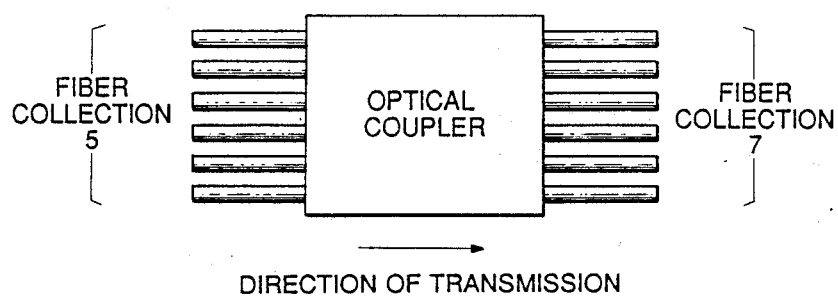
Figure 2:
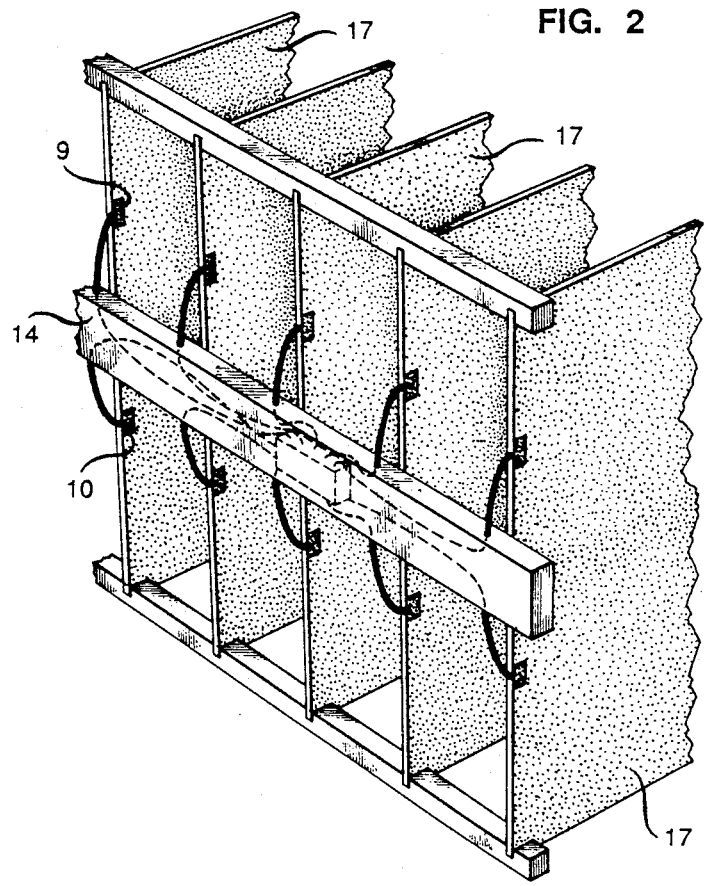

As discussed, optical waveguiding structures such as optical backplanes are produced utilizing a specific type of coupler. For pedagogic reasons, one embodiment, that having a coupler with an unequal number of fibers in each of its fiber collections, will be described. However, the description is equally applicable to couplers connecting an equal number of fibers. The compositions of the fibers utilized are not critical provided the NA's of the fibers are suitably matched to each other and to the core of the optical mixing region. For example, polymer-clad glass optical fibers such as described by W. B. Beck and M. H. Hodge, *Laser Focus*, Dec. 1984, and polymer optical fibers such as described as in R. W.

Lay, *Electronic Engineering Times*, Jan. 5, 1987, page 35 are utilized.

For an efficient coupler design the total fiber core cross-sectional area at the coupler end of the fibers and of the optical mixing core are significant. (The mixing region need not have a constant cross-section.) In particular, if there is a significant decrease in total core area between the fiber collections being interconnected in the direction of transmission or between any of the collections and the optical mixing core, inefficient transfer of light energy is obtained. Generally to satisfy this criterion of substantial matching the total core area of all the transmitting collections, the total core area of all the receiving collections, and the core area of the mixing region should be considered. The total core area of the receiving collection (the sum of the core area of all fibers in all receiving collections) should be a minimum of 50% of the maximum cross-sectional area of the core mixing region and a minimum of 50% of the total core area of the transmitting collections. Additionally, the minimum cross-sectional area of the core mixing region should be a minimum of 50% of the total cross-sectional area of the transmitting collections. (Cross-sectional areas are defined by a plane in the direction perpendicular to the lowest order guided mode.)

The numerical aperture of the optical mixing core region is determined by the refractive index of the region core and the refractive index of its surrounding cladding. (NA is defined in N. S. Kapany, *Fiber Optics, Principles and Applications*, Academic Press, New York, 1967, pp 7-9.) Flexibility in adjusting numerical aperture is generally obtained by adjusting the composition of the core material. Polymers yielding a wide range of refractive indices are available and allow the matching of numerical apertures. For example, resins such as silicones, e.g. dimethyl siloxanes, acrylics, e.g. poly(methyl methacrylate), polyesters, polyurethanes and epoxies yield refractive indices in the range of 1.39 to 1.57.

As discussed, the numerical apertures of each of the fibers utilized in a collection should be no mroe than 20% larger than those of all other fibers to which these collection fibers transmit and than that of the optical mixing region. In addition, the NA of the mixing region should be no more than 20% larger than that of all fibers to which it transmits. Larger differences generally lead to light energy transfer efficiencies lower than 65% which for typical applications are unacceptable. Numerical aperture matching has a substantial likelihood, depending on the materials selected, for producing large, e.g. on the order of 0.1, refractive index differences between the optical mixing core region and the cores of the fibers. Most significantly the applicants have found that the losses obtained even with this refractive index mismatch are acceptable if the numerical aperture mismatch is limited. Indeed, refractive index differences as large as 0.1 (provided numerical aperture differences are limited) still allow transfer efficiencies higher than 99% (based on reflection losses only).

Figure 3:
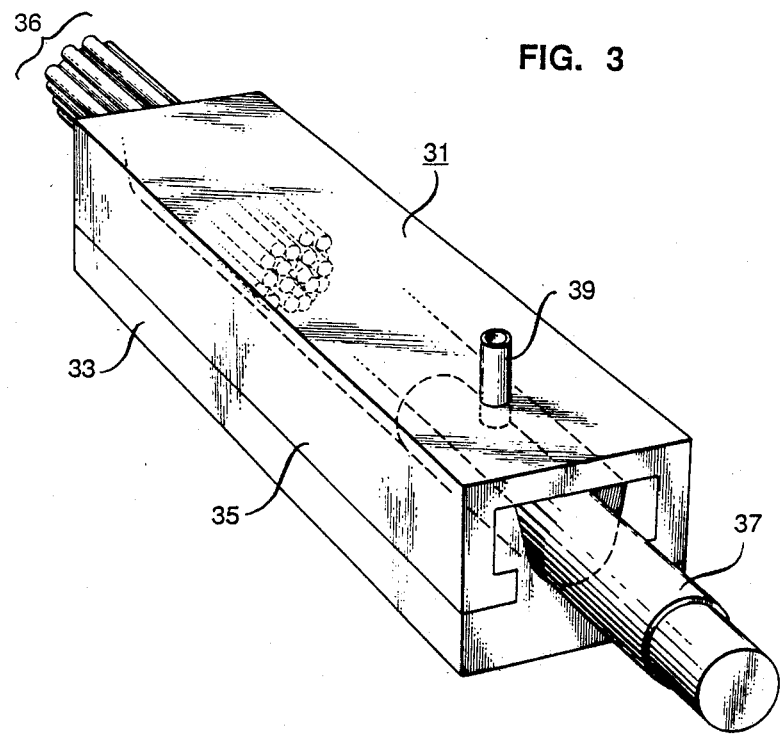

In one exemplary embodiment, shown in FIG. 3 devices falling within the constraints of suitable core area matching and numerical aperture matching are produced by a particularly cost effective forming technique. In this technique, a structure 31 that ultimately functions as the cladding of the optical mixing region is employed. The particular cross-sectional shape of this structure is not particularly critical. However it is undesirable for the cross-sectional area to decrease more than 50% in the direction of transmission anywhere in the optical mixing region. Alignment of the fiber ends in a collection is simplified if a structure such as a removable stop is employed. The stop on each end of the structure ensures that the end of the optical fibers are in the same plane. (This alignment is desirable because otherwise one fiber could shield another from the light energy transmitted through the optical mixing region.) Additionally, a split structure (with sections 33 and 35) allows insertion of the fiber collections, 36 and 37, into the connecting cladding region without producing particles from abrasion of the fiber ends with the cladding region. Such particles could produce undesirable scattering losses.

The structure is closed around the fiber collections and then is filled through port 39 with a suitable resin such as a silicone RTV resin, e.g. Shin-Etsu KE 103. The resin is then cured by, for example a thermal or ultraviolet technique. (The curing of a polymer by thermal or ultraviolet techniques is extensively discussed in F. W. Billmeyer, Jr., *Textbook of Polymer Science*, 2nd ed. Wiley-Interscience, New York, 1971, Chapter 16, and *U.V. Curing: Science and Technology*, S. P. Pappas editor, Technology Marketing Corp., Norwalk, Conn. 1980.) The curing of the polymer produces an appropriate optical medium and additionally functions as an adhesive to maintain the appropriate geometric relationship between the fiber collections. The cladding material for the optical mixing region is chosen to yield structural integrity and in conjunction with the core material to yield the NA match previously discussed. Additionally, the optical mixing core should have a transmission loss of less than 1 dB over the length of the optical mixing region. Exemplary materials for the cladding are fluoropolymers, e.g. perfluorinated ethylene/propylene copolymer and poly(vinylidene fluoride), poly(4-methyl pentene-1), poly(methyl methacrylate), and polyethylene.

The structure of the particular optical fibers utilized in each collection are not critical provided the cladding thickness is small compared with the core radius. Typically the cladding thickness should be less than 20% of the core effective radius. (The effective radius is the radius of a circle having the same area as the core.) Typically, polymer-clad glass fiber such as described by Beck and Hodge supra and fibers having plastic cores such as described by Lay supra are useful. Generally, large core plastic fibers are easier to manipulate than those utilizing a silica glass composition. However, as previously discussed the composition of the fiber in each collection is not critical and large diameter, glass core fibers are not precluded.

The following example is illustrative of structures suitable for the inventive devices.

EXAMPLE

Figure 4:
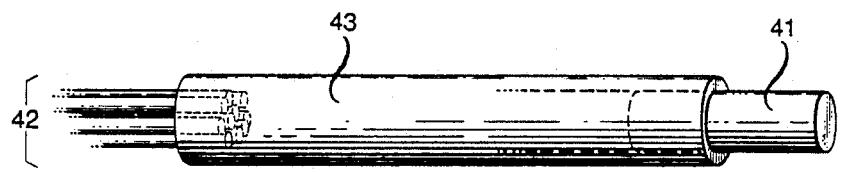

A coupler as shown in FIG. 4 was prepared which had one fiber, 41, on one end and 19 fibers, 42, on the opposing end. A collection of 19 fibers was prepared utilizing Ensign-Bickford Optics Company Type 200/230 HCS® (hard clad silica) fibers. These fibers were basically fluoroacrylate-clad silica fibers having a 200 $\mu$m diameter core and a cladding that was 230 $\mu$m in outside diameter. Each of the 19 fibers was manually cleaved utilizing a Deutsch DWR-1903-01 cleaving tool. Each fiber had an extruded external jacket of ethylene-tetrafluoroethylene copolymer which was removed in the region to be cleaved utilizing an AMP Inc.

microstrip tool. After cleaving, the jacket was removed for a distance of 1¼ inches from the cleaved end. The cleaved end of each fiber was inspected with a Newport Research Corporation Model F-IM2 fiber microinterferometer. The resulting interferometric data were monitored to insure clean, cleaved angles of approximately 90°.

One fiber was prepared as the second collection. This fiber had a core 1 mm in diameter and a cladding approximately 1.05 mm in outside diameter. The fiber was a proprietary product of Mitsubishi Rayon Inc. (Super ESKA) with a core of poly(methyl/methacrylate) and with what is believed to be a cladding of a fluorinated acrylic polymer.

This large polymer fiber was cut utilizing a razor blade. The cut end of the fiber was then held in a mechanical jig at 90° to the major plane of an abrasive paper that lay on a glass plate. The end was abraded successively on 15 $\mu$m, 1 $\mu$m and 0.3 $\mu$m abrasive paper.

The ends of a 4 inch length of perfluorinated ethylene/propylene copolymer tubing were cut at a 90° angle to the long axis and flared to expedite insertion of the fibers. The tube had an inside diameter of approximately .042 inch and wall-thickness of 0.016 inches. Both the 19 silica fibers and the one polymer fiber were treated with a Falcon Dust-off having a Stat-off-II alpha particle emitter attachment to remove any residue of debris from the cleaving and polishing processes.

The tube was taped utilizing transparent tape to a flat Mylar ® surface. The silica fibers were inserted one at a time into one end of the tube, 43. Utilizing an optical microscope the ends of the fibers were aligned to within one half the fiber outside diameter and positioned so that their ends were approximately three quarters of an inch into the tube. After alignment the fiber collection was also taped to the Mylar ® sheet.

A two-part silicone resin (KE 103) was purchased from Shin-Etsu Chemical Company. These materials included a vinyl-terminated poly(dimethylsiloxane) material and a proprietary silane cross-linking material catalyzed by a platinum compound. The two parts were mixed in a 20:1 ratio by weight as instructed by the manufacturer and stirred with a magnetic stirrer. The material was then degassed under a one Torr vacuum and after degassing was inserted into a 10 cc syringe having an 18 gauge needle.

The needle was carefully inserted approximately ½ inch into the end of the tube opposite the 19 fiber collection so that material was not abraded from the inside of the tube. The silicone material was then injected into the tube so that it flowed through the fiber collection filling the interstices and exiting the tube end. The needle was then slowly removed while maintaining the injection pressure so that the tube was entirely filled without introduction of air bubbles. Additional material was spread onto the exposed portion of the fibers which had the extruded copolymer jacket removed previously. The polymer fiber was then inserted approximately three quarters of an inch into the unoccupied end of the tube. This insertion was done relatively quickly so that air bubbles were not injected. This single fiber was also taped to the Mylar ® surface. The silicone resin was allowed to cure at room temperature for approximately 18 hours.

A photodetector (Photodyne Model 22 XL) was zeroed by injecting source electromagnetic radiation (either a 633 nm helium-neon laser or an 820 nm LED of respectively 5 mWatt and 1 mWatt power) into a polymer fiber having the same length as those utilized in the couplers. The laser or LED light was then injected into the polymer fiber end of the coupler and the light power emanating from each fiber in the 19 fiber collection was then measured utilizing the zeroed detector.

The transfer loss efficiency for the LED light was approximately 66.2% (1.79 dB loss). The average loss for each fiber was approximately 14.7 dB and the standard deviation for this loss was approximately 0.92 dB. (Losses and efficiencies for the laser source were within 3% of the LED values.) The same procedure was followed using only the laser to inject light into each of the 19 fibers in one collection. The light emanating from the single fiber collection was then measured. The transfer efficiency was approximately 69.2% (1.60 dB loss). The average loss was 1.66 dB with a standard deviation of approximately 0.1 dB.

We claim:

1. An optical waveguide device suitable for transmitting electromagnetic radiation comprising at least one optical fiber collection transmitting said electromagnetic radiation and at least one otpical fiber collection receiving said electromagnetic radiation, said collections comprising at least one fiber and said optical fiber collections optically connected by a waveguiding mixing region, said mixing region comprising a core and a cladding characterized in that the numerical aperture of each of said fibers transmitting said radiation into said mixing region is less than 20% larger than (A) the numerical aperture of all other fibers to which said fibers transmit and (B) the numerical aperture of said mixing region; the numerical aperture of said mixing region is less than 20% larger than the numerical aperture of all fibers to which said mixing region transmits, and the total core cross-sectional area of said receiving collections, the total core area of said transmitting collections, and the minimum core cross-sectional area of said mixing region are substantially matched.

2. The device of claim 1 wherein said device comprises an optical interconnection between electronic components.

3. The device of claim 1 wherein one of said collections consists of one optical fiber.

4. The device of claim 3 wherein said collections have a different number of said optical fibers.

5. The device of claim 1 wherein said collections have a different number of said optical fibers.

6. The device of claim 1 wherein said core of said mixing region comprises a material chosen from the group consisting of silicones, acrylics, polyesters, polyurethanes and epoxies.

7. The device of claim 6 wherein said cladding of said mixing region comprises an ethylene/propylene copolymer.

8. The device of claim 1 wherein said cladding of said mixing region comprises an ethylene/propylene copolymer.

* * * * *